US010070056B2

(12) United States Patent
Matsumoto et al.

(10) Patent No.: US 10,070,056 B2
(45) Date of Patent: Sep. 4, 2018

(54) OMNIDIRECTIONAL CAMERA SYSTEM

(71) Applicant: Panasonic Intellectual Property Management Co., Ltd., Osaka (JP)

(72) Inventors: Hajime Matsumoto, Kanagawa (JP); Takamasa Yokoyama, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 147 days.

(21) Appl. No.: 15/146,985

(22) Filed: May 5, 2016

(65) Prior Publication Data
US 2016/0344932 A1   Nov. 24, 2016

(30) Foreign Application Priority Data
May 18, 2015   (JP) ................................. 2015-101188

(51) Int. Cl.
*H04N 5/232* (2006.01)
*H04N 5/262* (2006.01)
*G06T 5/00* (2006.01)
*H04N 5/20* (2006.01)

(52) U.S. Cl.
CPC ......... *H04N 5/23238* (2013.01); *G06T 5/009* (2013.01); *H04N 5/2624* (2013.01); *H04N 5/20* (2013.01); *H04N 5/2628* (2013.01)

(58) Field of Classification Search
None
See application file for complete search history.

(56) References Cited

U.S. PATENT DOCUMENTS

| | | | |
|---|---|---|---|
| 6,486,908 B1* | 11/2002 | Chen | G06T 3/0018 345/441 |
| 9,088,715 B2* | 7/2015 | Ohmiya | H04N 5/23238 |
| 2002/0196340 A1* | 12/2002 | Kato | B60R 1/00 348/148 |
| 2008/0298674 A1* | 12/2008 | Baker | G06K 9/209 382/154 |
| 2009/0100767 A1* | 4/2009 | Kondo | G03B 21/10 52/6 |
| 2010/0157145 A1* | 6/2010 | Dimnik | H04N 7/0122 348/445 |
| 2010/0214398 A1* | 8/2010 | Goulart | H04N 21/2387 348/61 |
| 2011/0103655 A1* | 5/2011 | Young | G06T 7/33 382/128 |

(Continued)

FOREIGN PATENT DOCUMENTS

| | | |
|---|---|---|
| JP | 11-002795 | 1/1999 |
| JP | 2011-009937 | 1/2011 |

(Continued)

*Primary Examiner* — Mohammad J Rahman
(74) *Attorney, Agent, or Firm* — Renner Otto Boisselle & Sklar, LLP

(57) ABSTRACT

An omnidirectional camera system includes an omnidirectional camera that acquires an omnidirectional image by capturing using a fish-eye lens and an image processing device which displays the plurality of partial images which are cut out from the omnidirectional image side by side on one screen, in which the omnidirectional camera performs luminance adjustment with respect to the omnidirectional image, and the image processing device performs gradation adjustment processing in each partial image with respect to the plurality of partial images.

4 Claims, 7 Drawing Sheets

1 : OMNIDIRECTIONAL CAMERA SYSTEM

(56) References Cited

U.S. PATENT DOCUMENTS

| | | | |
|---|---|---|---|
| 2012/0105578 A1* | 5/2012 | Ohmiya | H04N 5/23238 348/36 |
| 2013/0162697 A1 | 6/2013 | Kobayashi et al. | |
| 2014/0267593 A1* | 9/2014 | Kim | H04N 5/23238 348/36 |
| 2014/0321771 A1* | 10/2014 | Reinisch | G06T 11/60 382/284 |
| 2015/0022627 A1 | 1/2015 | Sato et al. | |
| 2018/0020141 A1* | 1/2018 | Wang | H04N 5/235 |

FOREIGN PATENT DOCUMENTS

| | | |
|---|---|---|
| JP | 2013-130727 | 7/2013 |
| JP | 2013-239986 A | 11/2013 |
| JP | 2015-023512 | 2/2015 |

\* cited by examiner

FISH-EYE IMAGE

FOUR-SCREEN PTZ IMAGE

FOUR-SCREEN IMAGE (PTZ)

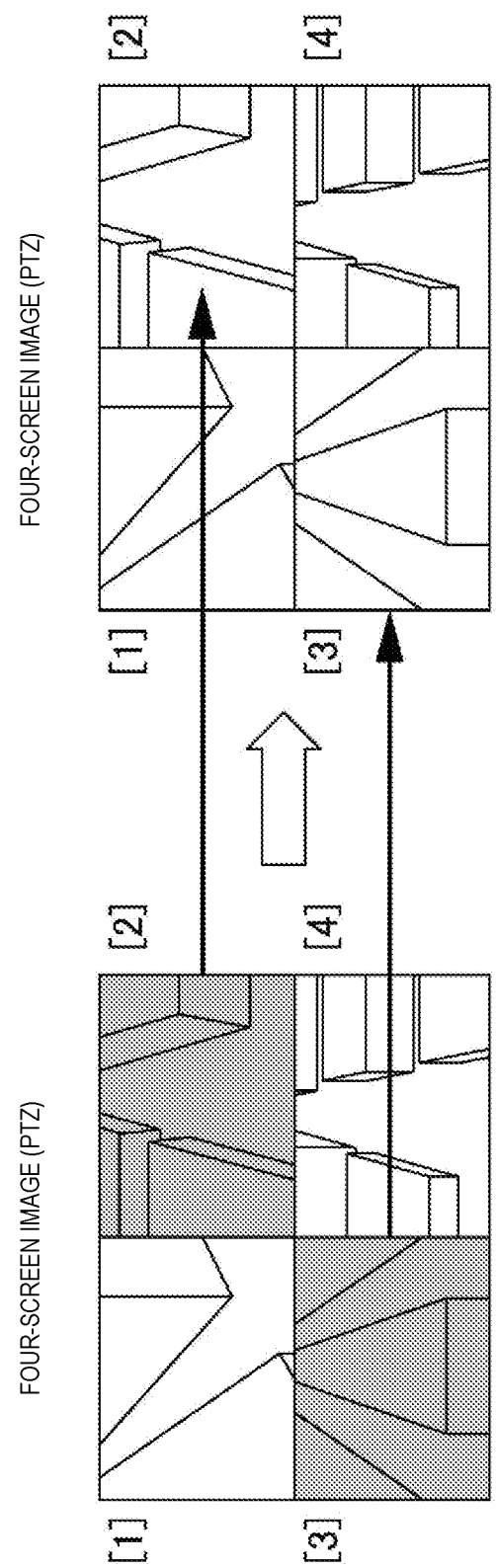

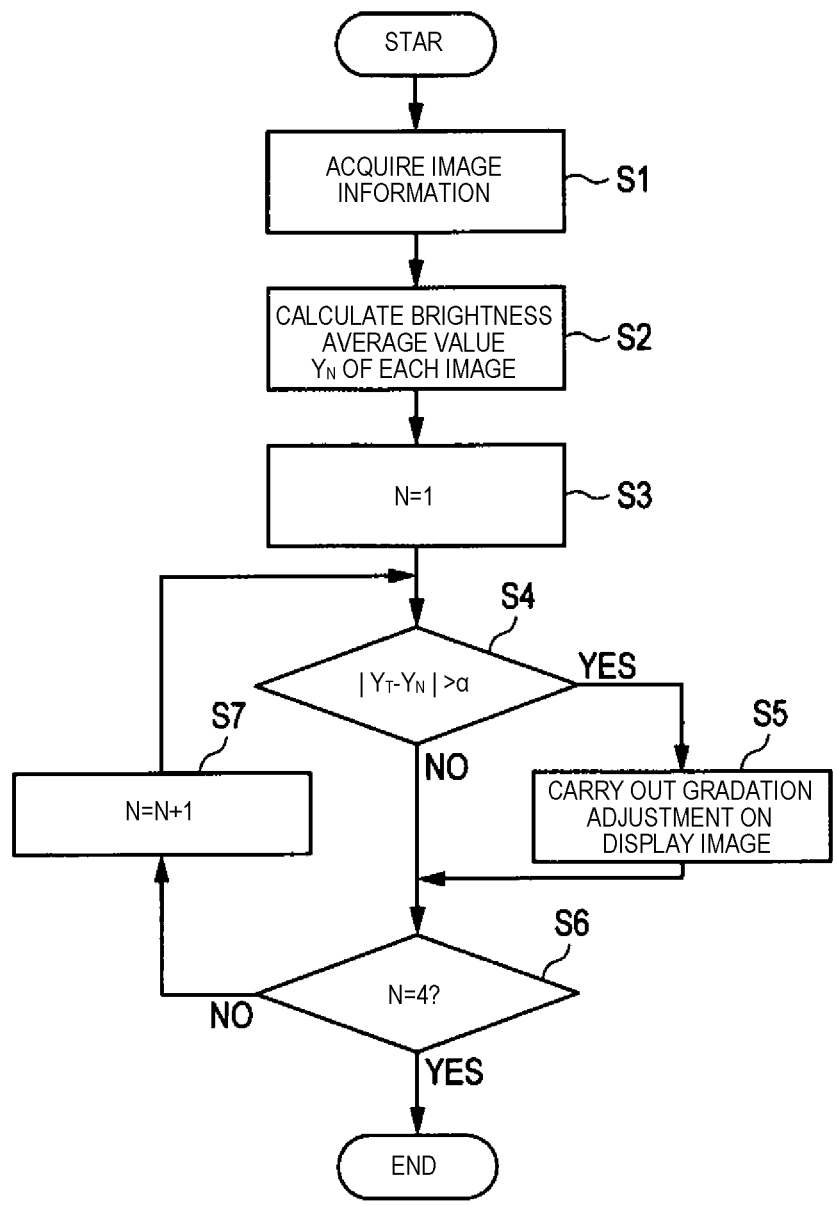

OMNIDIRECTIONAL CAMERA SYSTEM

BACKGROUND OF THE INVENTION

1. Field of the Invention

The present disclosure relates to an omnidirectional camera system which performs image processing with respect to a plurality of partial images which are cut out from an omnidirectional image.

2. Description of the Related Art

In the related art, a technology is devised in which a plurality of partial images are cut out from an omnidirectional image that is obtained by capturing by an omnidirectional camera using a fish-eye lens, and the partial images are displayed side by side on one screen. For example, in Japanese Patent Unexamined Publication No. 2013-239986, an omnidirectional camera system is described in which deformation correction is performed on a plurality of partial images which are cut out from the omnidirectional image and the plurality of partial images are output on one screen.

There is a case in which the plurality of partial images which are cut out from the omnidirectional image described above are images in which respectively different locations are captured, and different brightness is set according to the respective locations. In addition, the brightness of each partial image is changed dependent on time according to environmental conditions such as exposure to the sun and turning an electric light switch on and off.

However, since gradation (brightness) adjustment in the related art is performed with respect to the omnidirectional image, for example, when one partial image is set to be bright, all other partial images become too bright since the entire screen becomes bright. And vice versa in the same manner, for example, when one partial image is set to become dark, all other partial images become dark since the entire screen becomes dark. In this manner, there is a problem in the related art in which it is not possible to set uniform image quality (brightness) in all of the plurality of partial images.

SUMMARY OF THE INVENTION

The present disclosure is carried out in consideration of the above circumstances, and an object thereof is to provide an omnidirectional camera system in which it is possible to adjust all of the plurality of partial images which are cut out from the omnidirectional image with uniform image quality.

The omnidirectional camera system of the present disclosure is an omnidirectional camera system which has an omnidirectional camera that acquires the omnidirectional image by capturing using a fish-eye lens and an image processing device which displays the plurality of partial images which are cut out from the omnidirectional image side by side on one screen, in which the omnidirectional camera performs luminance adjustment with respect to the omnidirectional image, and the image processing device performs gradation adjustment processing in each partial image with respect to the plurality of partial images.

According to the present disclosure, since image processing such as luminance adjustment is performed with respect to the omnidirectional image, and image quality adjustment is performed with respect to each of the plurality of partial images that are cut out from the omnidirectional image, it is possible to adjust all of the plurality of partial images with uniform image quality.

BRIEF DESCRIPTION OF DRAWINGS

FIG. 7 is a diagram illustrating an example in which only two partial images are dark in the four-screen PTZ image which is obtained from the omnidirectional camera; and FIG. 8 is a flow diagram for describing an operation of the image processing device.

DETAILED DESCRIPTION OF THE PREFERRED EMBODIMENT

The present embodiment will be described in detail below with reference to the drawings.

Figure 1:
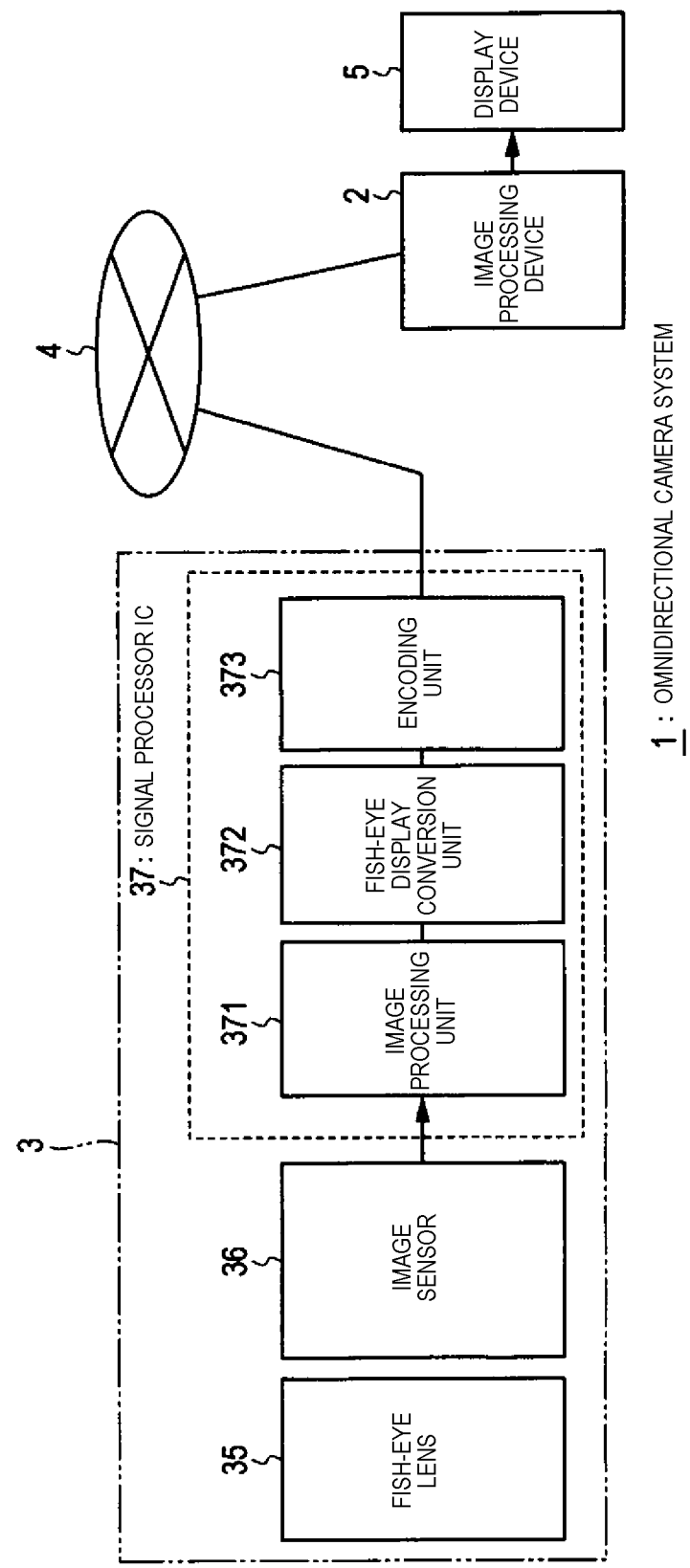
FIG. 1 is a block diagram illustrating a schematic configuration of an omnidirectional camera system according to an embodiment of the present invention.

FIG. 1 is a block diagram illustrating a schematic configuration of omnidirectional camera system 1 according to an embodiment of the present invention. As shown in FIG. 1, omnidirectional camera system 1 according to the present embodiment has at least image processing device 2 and omnidirectional camera 3. Image processing device 2 acquires four partial images using a fish-eye image (hereinafter referred to as omnidirectional image) which is output from omnidirectional camera 3 that is used by fish-eye lens 35, and performs image quality adjustment which includes gradation (brightness) with respect to respective partial images. A detailed description of image processing of image processing device 2 will be described later.

Figure 2:
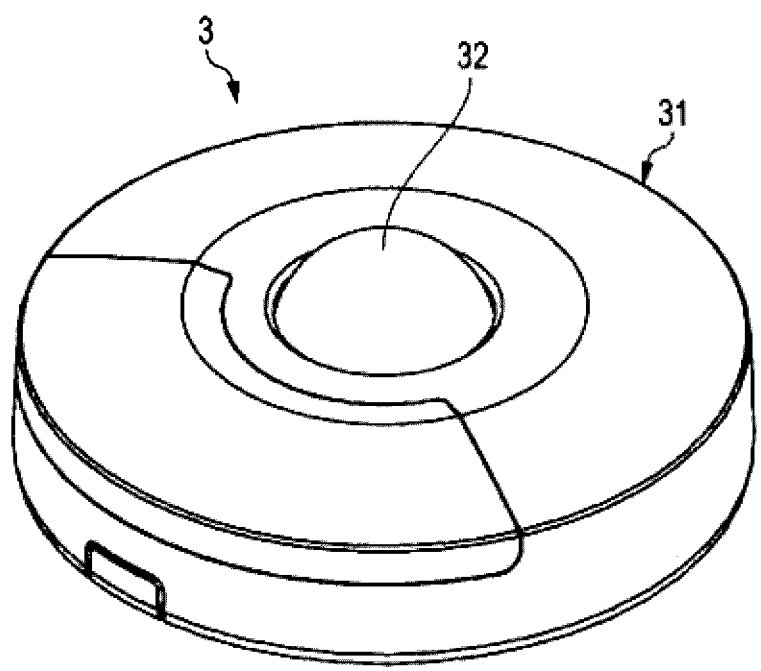
FIG. 2 is a perspective view illustrating an outer appearance of an omnidirectional camera.

FIG. 2 is a perspective view illustrating an outer appearance of omnidirectional camera 3 in FIG. 1. As shown in FIG. 2, omnidirectional camera 3 has casing 31 of a substantially circular plate form in which transparent lens cover 32 is provided in a hemispherical form in the center. As shown in FIG. 1, fish-eye lens 35, image sensor 36, and a signal processing integrated circuit (IC) 37 are provided within casing 31.

Figure 3A:
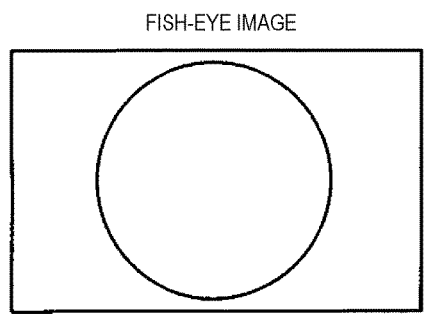
FIG. 3A is a diagram illustrating the omnidirectional image which is captured by an image sensor of the omnidirectional camera.
Figure 3B:
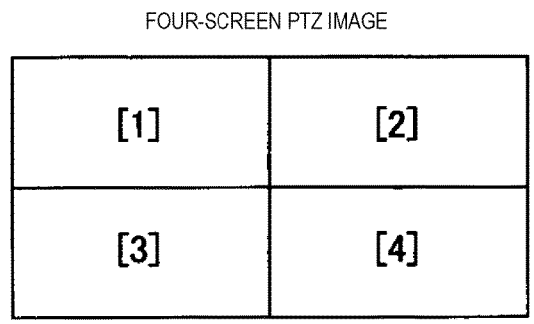
FIG. 3B is a diagram illustrating a four-screen PTZ image after four-screen PTZ conversion is carried out by a signal processing IC.

Fish-eye lens 35 is disposed within lens cover 32, and light which is transmitted through lens cover 32 is formed in image sensor 36. Image sensor 36 converts and outputs omnidirectional light which is input from fish-eye lens 35 in an electrical signal. For example, image sensor 36 is a charge coupled device (CCD) or a complementary metal oxide semiconductor (CMOS). Signal processor IC 37 performs predetermined processing with respect to the electrical signal which is output from image sensor 36 and distributes on network 4, and has image processing unit 371 which performs image processing such as luminance adjustment with respect to the omnidirectional image, fish-eye display conversion unit 372 which converts the omnidirectional image to a four-screen pan, tilt, zoom (PTZ) image, and encoding unit 373 which performs compression processing and transmission of the four-screen PTZ image. In particular, fish-eye display conversion unit 372 cuts out four images from the omnidirectional image, and performs conversion deformation processing such as affine transformation with respect to each partial image and converts to a rectangular. FIG. 3A is a diagram illustrating the omnidirectional image (fish-eye image) which is captured by image sensor 36, and FIG. 3B is a diagram illustrating the four-screen PTZ image after four-screen PTZ conversion is carried out by signal processing IC 37. In FIG. 3A, the omnidirectional image is displayed in a portion which is drawn in a circle. In addition, in FIG. 3B, the four-screen PTZ image is displayed in four portions which are separated by a square.

Image processing device 2 has a CPU which is not shown in the drawings, a read only memory (ROM), and a random access memory (RAM), and stores a control program for operating the CPU in the ROM. A display program which adjusts gradation of four partial images that are four-screen PTZ images is included in the control program. The RAM is used in the operation of the CPU as a work memory.

Figure 4:
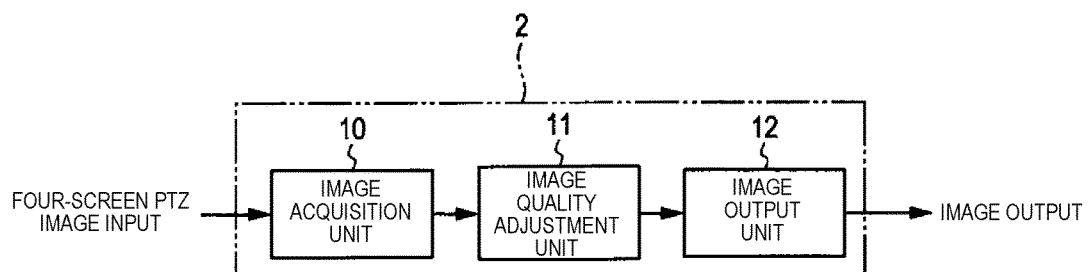
FIG. 4 is a functional block diagram of an image processing device.

Image processing device 2 acquires the four partial images which are four-screen PTZ images that are distributed from omnidirectional camera 3 on network 4 from the network 4, and decodes each partial image. Then, image processing device 2 performs and outputs image quality adjustment that includes gradation (brightness) with respect to each of the decoded four partial images. FIG. 4 is a functional block diagram of image processing device 2. As shown in the drawings, image processing device 2 has image acquisition unit 10, image quality adjustment unit 11, and image output unit 12.

Image acquisition unit 10 acquires the four-screen PTZ images that are distributed from omnidirectional camera 3 on network 4 from network 4. Image quality adjustment unit 11 performs image quality adjustment processing in each partial image with respect to the four partial images of the four-screen PTZ images which are acquired by image acquisition unit 10. Image output unit 12 outputs the image that displays the four partial images on which the image quality adjustment processing is performed by image quality adjustment unit 11 side by side on one screen.

The image quality adjustment processing which is performed by image quality adjustment unit 11 includes gradation adjustment processing (brightness adjustment processing) which adjusts gradation (brightness) of the partial image. In the present embodiment, image quality adjustment unit 11 performs gradation adjustment processing as the image quality adjustment processing.

Image quality adjustment unit 11 calculates the average value of the gradation of image information of a plurality of frames in each partial image, and in each partial image, adjusts gradation of the partial image based on the average value of the gradation.

In this manner, since image processing device 2 adjusts the gradation of the partial image in each partial image, for example, even if one out of four partial images become dark, since gradation adjustment is performed on the partial image which is unrelated to another partial image, it is possible to adjust all of the four partial images with uniform image quality.

Figure 5:
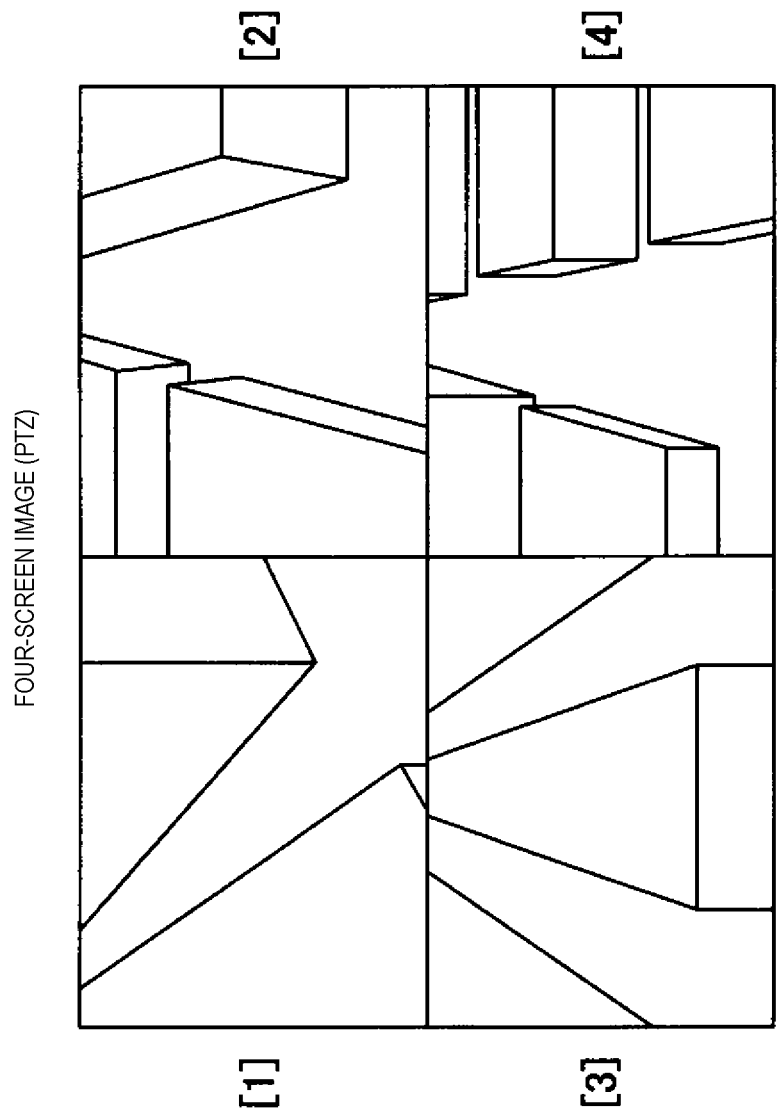
FIG. 5 is a diagram illustrating an example in which all of four partial images have approximately a uniform brightness in the four-screen PTZ image that is obtained from the omnidirectional camera.
Figure 6:
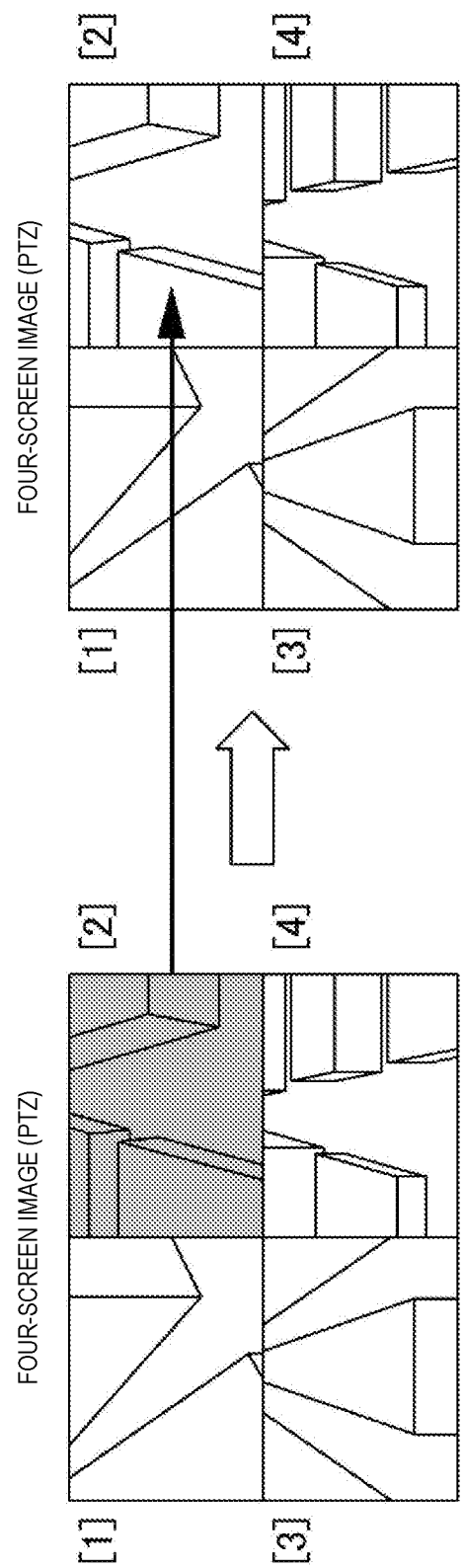
FIG. 6 is a diagram illustrating an example in which only one partial image is dark in the four-screen PTZ image which is obtained from the omnidirectional camera.

FIG. 5 is a diagram illustrating an example in which all of four partial images have approximately a uniform brightness in the four-screen PTZ image which is obtained from omnidirectional camera 3. In the example shown in the drawing, since it is not necessary to perform gradation adjustment, all of the cut out four partial images are displayed on the screen without change. FIG. 6 is a diagram (left diagram) illustrating an example in which only one partial image is dark in the four-screen PTZ image which is obtained from omnidirectional camera 3. In the example shown in the drawing, gradation adjustment is performed only with respect to the partial image in [2], and as a result, all of the four partial images as shown in the right diagram have uniform image quality. FIG. 7 is a diagram (left diagram) illustrating an example in which two partial images are dark in the four-screen PTZ image which is obtained from omnidirectional camera 3. In the example shown in the drawing, gradation adjustment is performed with respect to each partial image in [2] and [3], and as a result, all of the four partial images as shown in the right diagram have uniform image quality.

Next, operation of image processing device 2 of the present embodiment is described.

FIG. 8 is a block diagram for describing the operation of image processing device 2 according to the present embodiment. First, image acquisition unit 10 acquires image information from network 4 (step S1). That is, acquires the four-screen PTZ images that are distributed on network 4 from omnidirectional camera 3 from network 4. In this case, image information of a plurality of frames is acquired in order to obtain the average value of gradation of each partial image.

After image acquisition unit 10 acquires the image information of the plurality of frames, the average values $Y_N$ (N=1, 2, 3, 4) of the gradation of the image information of the plurality of frames in each partial image are calculated by image quality adjustment unit 11 (step S2).

After image quality adjustment unit 11 calculates the average value $Y_N$ of the gradation of each partial image, image quality adjustment unit 11 determines that an absolute value of a difference between the average value $Y_N$ of the gradation and a target brightness value $Y_T$ in each partial image exceeds a predetermined threshold α (step S3 to S7).

First, image quality adjustment unit 11 determines that the absolute value of a difference between the average value Y1 of the gradation and the target brightness value $Y_T$ in the partial image in [1] exceeds a predetermined threshold α (step S3, step S4). In the determination in step S4, in a case where $|Y_T-Y_1|>α$ (step S4: YES), it is determined that the partial image in [1] is dark, and gradation adjustment processing is performed with respect to the partial image (step S4). That is, gradation increases. For example, when the target brightness value YT=10, the average value Y1=1, and α=5, since |YT−Y1|=9 >α, it is determined that the partial image in [1] is "dark", and gradation increases (step S5).

In contrast to this, in the determination in step S4, in a case where |YT−Y1|≤α (step S4: NO), it is determined that the partial image in [1] is "bright", and gradation adjustment processing is not performed on the partial image in [1].

After image quality adjustment unit 11 performs processes (step S4, step S5) with respect to the partial image in [1], the flow proceeds to step S6 (NO), step S7. Then, image quality adjustment unit 11 performs the same processes (step S4, step S5) in each partial image in [2], [3], and [4]. By doing this, image quality adjustment is performed with respect to each of the four partial images.

After the process in FIG. 7 is performed (step 6: YES), image output unit 12 outputs an image which displays the four partial images that are output from image quality adjustment unit 11 side by side on one screen to display device 5.

Here, in the gradation adjustment processing, an amount of adjustment may be set to a large value and the gradation may be largely changed at once, and the amount of adjustment may be set to a small value and the gradation may be gradually changed. In a case where the gradation is gradually changed, in the flow diagram in FIG. 8, after step S5, the flow returns to step S4.

A case occurs in which the processes in steps S4 and S5 in FIG. 8 are performed a plurality of times in each partial image by setting the amount of adjustment to a small value, but since fine adjustment of gradation is possible, there is a merit in that it is possible to further make the image quality uniform in the four partial images of [1] to [4].

In addition, the timing at which image quality adjustment unit 11 performs the gradation processing each may be set such that a predetermined time elapses so as to be at equal intervals, and may be when a predetermined condition is satisfied. For example, a luminometer may be installed which measures illuminance of a location at which the partial image is captured, and image quality adjustment unit 11 may perform the gradation adjustment processing at the timing at which a difference between illuminance when the gradation adjustment processing is performed the previous time and current illuminance exceeds the predetermined threshold.

In this manner, according to the embodiment, since image processing such as luminance adjustment is performed with respect to the omnidirectional image, the gradation adjustment processing is performed in each of the four partial images of the four-screen PTZ image in which the omnidirectional image is converted after image processing, and the four partial images after the gradation adjustment processing are displayed side by side on one screen, it is possible to adjust all of the four partial images which are cut out from the omnidirectional image with uniform image quality.

Here, in the present embodiment, "four" partial images are cut out from the omnidirectional image, but the present invention is not limited thereto, and there may be "two" or more.

In addition, in the present embodiment, a case is described in which luminance adjustment is performed with respect to the omnidirectional image in omnidirectional camera 3 (signal processing IC 37), and gradation adjustment processing is performed in each partial image in image processing device 2 (image quality adjustment unit), but the present invention is not limited thereto, and in omnidirectional camera 3 (signal processing IC 37), both the luminance adjustment and the gradation adjustment processing of each partial image may be performed with respect to the omnidirectional image.

In addition, the embodiment may have a function which adjusts exposure of image sensor 36 of omnidirectional camera 3 in image quality adjustment unit 11 of image processing device 2. In this case, the image quality adjustment unit 11 may perform communication with omnidirectional camera 3 via image acquisition unit 10. Image quality adjustment unit 11 calculates the average value of gradation of the partial images of [1] to [4], and obtains the absolute value of the difference between the average value of the obtained gradation and the target brightness value. Then, in a case where the absolute value of the difference exceeds the predetermined threshold, it is determined that exposure of image sensor 36 is insufficient and an exposure time of image sensor 36 is long. In this case, the exposure time of image sensor 36 may be long and may be short. It takes time until the exposure time of image sensor 36 is determined by shortening the adjusted exposure time, but it is possible to accurately set the exposure time.

In addition, it is also possible to store and distribute the display program of the embodiment in a storage medium such as a magnetic disk, an optical disc, a magneto-optical disc, and a semiconductor memory.

What is claimed is:

1. An omnidirectional camera system comprising:
   an omnidirectional camera that acquires an omnidirectional image by capturing using a fish-eye lens; and
   an image processing device which displays a plurality of partial images which are cut out from the omnidirectional image side by side on one screen, the plurality of partial images are four-screen PTZ images, in which respectively different four directions being captured,
   wherein the omnidirectional camera is connected to the image processing device via a network and distributes the four-screen PTZ images to the image processing device via the network,
   the omnidirectional camera includes
      an image processing unit which performs image processing including luminance adjustment with respect to the omnidirectional image,
      a fish-eye display conversion unit which converts the omnidirectional image to the four-screen PTZ images, and
      an encoding unit which performs compression processing with respect to the four-screen PTZ images from the omnidirectional image subsequent to the luminance adjustment by the image processing unit, and transmits the four-screen PTZ images to the image processing device via the network, and
   the image processing device includes
      an image quality adjustment unit which performs image quality adjustment processing including gradation adjustment processing performed individually with respect to the respective four-screen PTZ images received via the network, and
      displays independently the four-screen PTZ images in four directions, on which the image quality adjustment processing is performed by image quality adjustment unit side by side on one screen.

2. The omnidirectional camera system of claim 1, wherein the image quality adjustment unit calculates the average value of the gradation of image information of a plurality of frames in each partial image, and increases gradation of the partial image in which an absolute value of a difference between a target luminance value and the average value of gradation exceeds a first threshold.

3. The omnidirectional camera system of claim 1, further comprising:
   an illuminance measurement unit which measures illuminance of a location at which the partial image is captured,
   wherein the image quality adjustment unit performs the gradation adjustment processing at the timing at which a difference between illuminance when the gradation adjustment processing is performed the previous time and current illuminance exceeds a second threshold.

4. An image processing method that is used in an omnidirectional camera system comprising:
   capturing an omnidirectional image with an omnidirectional camera using a fish-eye lens, performing, using an image processing unit included in the omnidirectional camera, image processing including luminance adjustment with respect to the omnidirectional image, cutting out a plurality of partial images from the omnidirectional image, the plurality of partial images being four-screen PTZ images, in which respectively different four directions are captured performing, using an encoding unit included in the omnidirectional camera, compression processing with respect to the four-screen PTZ images from the omnidirectional image subsequent to the luminance adjustment by the image processing unit, connecting the omnidirectional camera to an image processing device via a network and distributing the four-screen PTZ to the image processing device via the network, using the encoding unit included in the omnidirectional camera, transmitting the four-screen PTZ to the image processing device via the network, and performing individually, using the image processing device, image quality adjustment processing including gradation adjustment processing with respect to the respective four-screen PTZ images received via the network and displaying independently the four-screen PTZ images in four directions side by side on one screen.

* * * * *